May 31, 1966  G. A. GRUBB  3,253,421
ABSORPTION REFRIGERATION
Filed Dec. 2, 1964  3 Sheets-Sheet 3
FIG. 4
FIG. 5
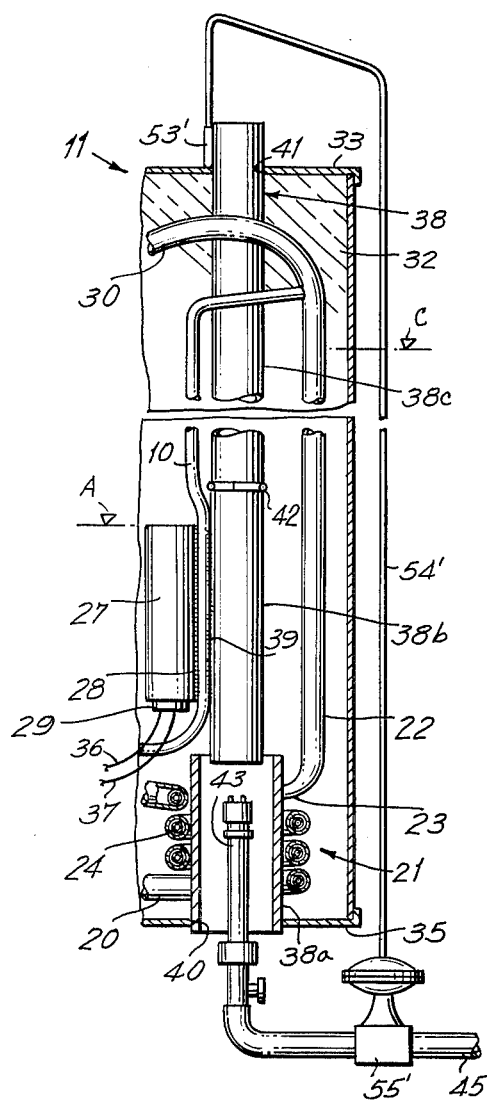
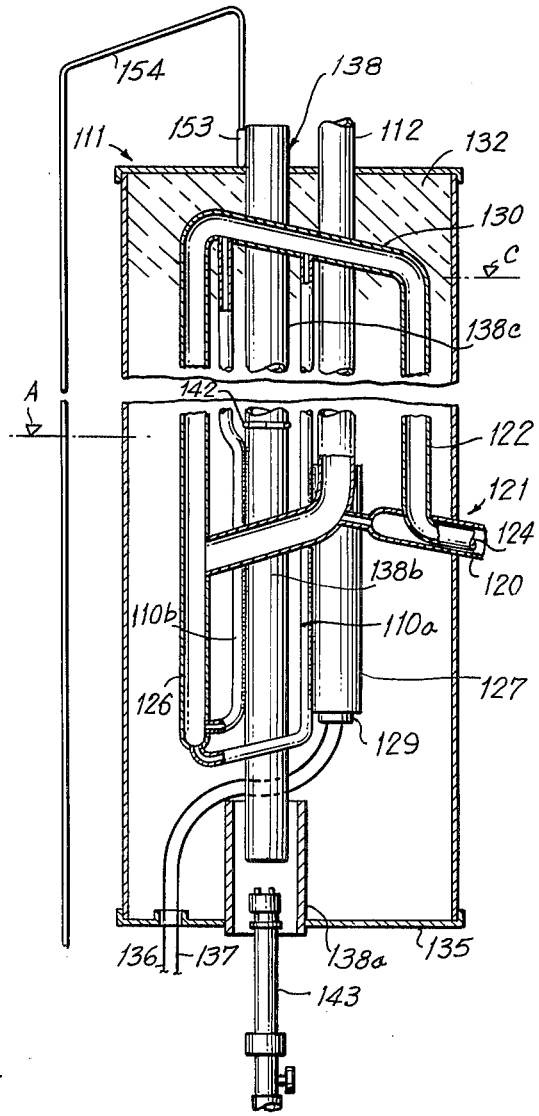

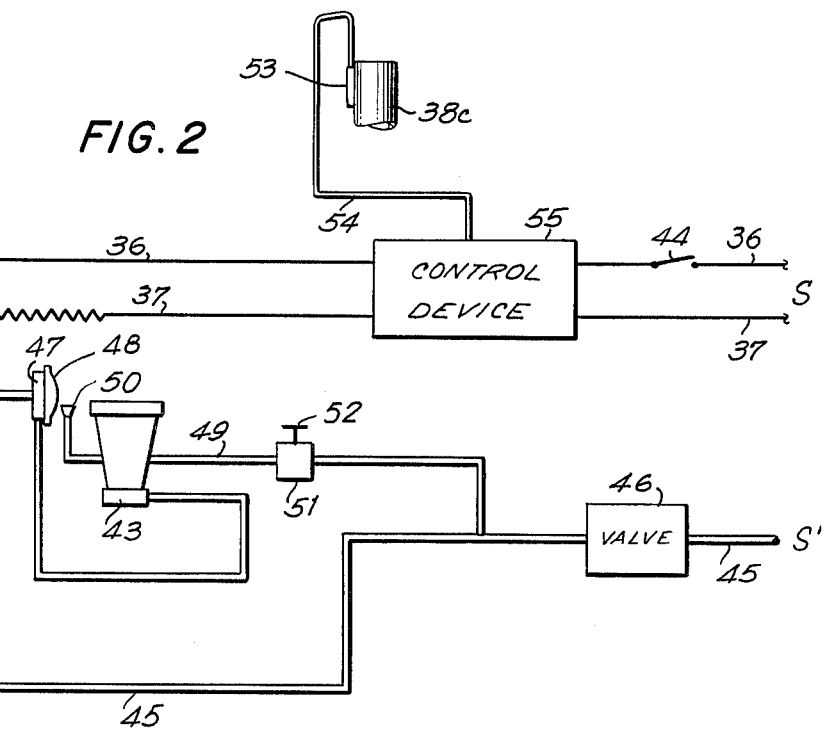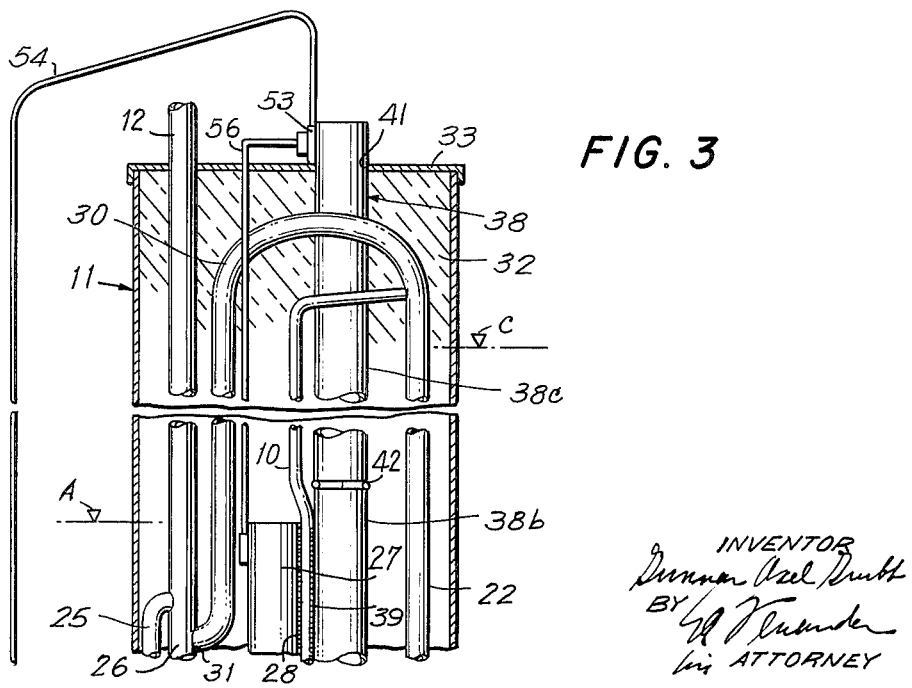

United States Patent Office 3,253,421
Patented May 31, 1966

3,253,421
ABSORPTION REFRIGERATION
Gunnar Axel Grubb, Bromma, Sweden, assignor to Aktiebolaget Electrolux, Stockholm, Sweden, a corporation of Sweden
Filed Dec. 2, 1964, Ser. No. 415,386
Claims priority, application Sweden, Dec. 3, 1963, 13,403/63
8 Claims. (Cl. 62—148)

My invention relates to absorption refrigeration apparatus of the kind in which vapor is expelled out of solution by heating in a vapor-expulsion unit.

It has already been proposed to provide for absorption refrigeration apparatus heating structure which is suitable for operation by different sources of heat, either by an electrical heater or by a gaseous fuel burner, for example, each of which alone is capable of supplying heat at an adequate rate and at a sufficiently elevated temperature to effect normal operation of the refrigeration apparatus under all conditions under which the apparatus is intended to be operated. If the electrical heater and fluid fuel burner are operated at the same time for a prolonged interval of time, the vapor-expulsion unit will be subjected to excessive heating which tends to shorten the life of the refrigeration apparatus.

It is an object of my invention to provide for a vapor-expulsion unit of absorption refrigeration apparatus improved heating structure of this type in which one of two sources of heat is rendered inoperable to supply heat in a normal range to the vapor-expulsion unit when the apparatus is connected to both sources of heat at the same time, the supply of heat by the one heat source in such case being reduced or stopped.

Another object of the invention is to provide for a vapor-expulsion unit of absorption refrigeration apparatus an improved heating structure of this type in which at least one of two sources of heat connected to supply heat to the vapor-expulsion unit at the same time is rendered inoperable to supply heat in the normal range to the vapor-expulsion unit responsive to an abnormally high temperature condition affected by one or more parts of the vapor-expulsion unit, the supply of heat by the one source in such case being reduced or stopped.

The invention, together with the above and other objects and advantages thereof, will be more fully understood upon reference to the following description and the accompanying drawing forming a part of this specification, and in which:

FIG. 2 is a diagrammatic representation of circuits for controlling the heating of the vapor-expulsion unit shown in FIG. 1;

FIGS. 3 and 4 are diagrammatic views of vapor-expulsion units like that shown in FIG. 1 provided with heating structures illustrating other embodiments of the invention; and FIG. 5 is a view diagrammatically illustrating another form of vapor-expulsion unit suitable for being heated by heating structure embodying the invention.

Figure 1:
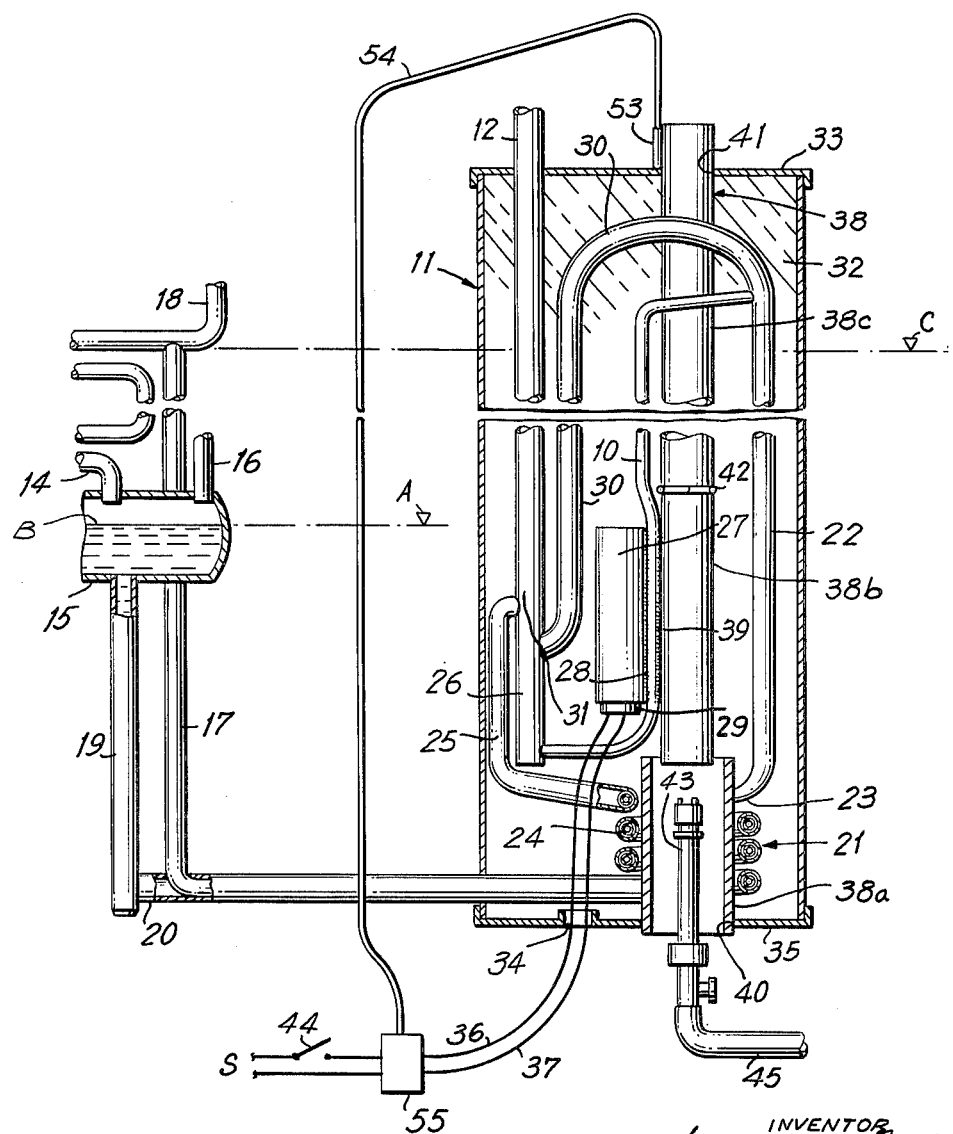
FIG. 1 illustrates more or less diagrammatically an absorption liquid circuit of absorption refrigeration apparatus including a generator or vapor-expulsion unit provided with heating structure embodying the invention.

In FIG. 1 of the drawing, the invention is embodied in absorption refrigeration apparatus of a uniform pressure type containing an inert pressure equalizing gas. Refrigerant vapor is expelled from absorption liquid in a vapor lift pipe 10 of a generator or vapor-expulsion unit 11, and, in a manner to be described presently, passes through a conduit 12 to a condenser. The refrigerant vapor, such as ammonia, is liquefied in the condenser and flows into an evaporator in which the refrigerant evaporates and diffuses into an inert gas, such as hydrogen, to produce a refrigerating effect. The resulting gas mixture of refrigerant and inert gas flows from the evaporator to an absorber which may be of an air-cooled type including a coil 14 and an absorber vessel 15 to which the lower end of the coil is connected, such gas mixture entering the absorber vessel 15 through a conduit 16.

In the absorber refrigerant is absorbed from the gas mixture into absorption liquid, such as water, which is delivered thereto through a conduit 17, and the absorption liquid enriched in refrigerant passes into the absorber vessel 15. The inert gas is returned from the absorber to the evaporator in the path of flow including a conduit 18, and the enriched absorption liquid is conducted through a conduit 19 and outer pipe 20 of a liquid heat exchanger 21 to the vapor-expulsion unit 11.

The absorption liquid from which refrigerant vapor has been expelled, which is referred to as weak absorption liquid, flows from the lower end of standpipe 22 into a conduit 23 which is connected to the inner pipe 24 of liquid heat exchanger 21. From the inner passage 24 of liquid heat exchanger 21 weak absorption liquid flows upward through conduit 17 into the upper part of the absorber coil 14 to absorb refrigerant vapor. In order to simplify the drawing, the condenser, evaporator and connections therefor have not been shown, such parts being well known and their illustration not being necessary for an understanding of this invention.

Absorption solution enriched in refrigerant flows from the absorber vessel 15 through conduit 19, outer pipe 20 of liquid heat exchanger 21 and conduit 25 into a vertically extending standpipe 26. The extreme lower end of pipe 26 is in communication with the lower end of vapor lift pipe 10 which is in thermal exchange relation with a heating tube 27 at 28, as by welding, for example. The heating tube 27 is arranged to be heated by an electrical heating element 29 disposed within the tube.

The part of the pump or lift pipe 10 in thermal exchange relation with the heating tube 27 may be referred to as the vapor-forming part, in which vapor bubbles are formed due to heat derived from the heating tube. Due to the formation of these vapor bubbles which tend to collect and become larger and larger, liquid in the vapor lift pipe 10 becomes segregated, whereby slugs of liquid are caused to rise in the lift pipe by vapor lift action. Upward movement is imparted to liquid in the vapor lift pipe 10 under the influence of a "reaction head" formed by the liquid column maintained in standpipe 26.

Vapor generated in the vapor lift pipe 10 flows from the upper end thereof through the upper part of standpipe 22 and a conduit 30 to a region 31 in pipe 26 which serves as an analyzer and is disposed below the liquid surface level A of the liquid column contained therein, the liquid level A being essentially the same as the liquid level B in the absorber vessel 15. The absorption liquid introduced into the analyzer 31 from the conduit 25 is relatively rich in refrigerant and at a lower temperature than the generated vapor, and, in bubbling through the enriched solution, water vapor present in the vapor is cooled sufficiently and condenses and in this way is removed from ammonia vapor. From the analyzer 31 refrigerant vapor flows upward in pipe 26 into conduit 12 and passes to the condenser, as previously explained.

The absorption liquid from which refrigerant vapor has been expelled flows by gravity from standpipe 22 through the conduit 23 and inner pipe 24 of liquid heat exchanger 21 and conduit 17 into the upper part of absorber coil 14. The liquid surface level maintained in standpipe 22 is at a higher level than the level C at which liquid is introduced into absorber coil 14 from the upper end of conduit 17.

The evapor-expulsion unit 11 in its entirety, together with a major portion of the liquid heat exchanger 21, are embedded in a body of insulation 32 retained in a metal shell or casing 33 having an opening 34 at the bottom 35 thereof, the shell being rectangular or circular in horizontal cross-section. The heating tube 27 is embedded in a part of the insulation 32 which is intermediate the ends thereof and spaced from the top and bottom ends of the shell 33.

Electrical conductors 36 and 37 for the electrical heating element 29 pass through the bottom opening 34 of the casing 33 and extend through the insulation 32. The heating tube 27 snugly receives the heating element 29 which may comprise a cartridge housing an electrical wire or the like having a relatively high resistance that generates heat when connected to a source of electrical energy.

The vapor-expulsion unit or generator 11 of FIG. 1 is formed of piping to provide a compact bundle or cluster of parts which is elongated in the vertical direction and is relatively narrow in horizontal cross-section. Thus, the heating tube 27, vapor lift pipe 10, standpipes 22 and 26 and pipe 30 are formed of pipes or conduits disposed closely adjacent to one another, although they are diagrammatically illustrated in a single plane in FIG. 1 in order to simplify the drawing. In order to reduce radiation heat losses and conserve heat, it is usually the practice to embed the parts of the generator or vapor-expulsion unit 11 in a body of insulation having a passage therein which extends to the exterior of the insulating body, so that the electrical heating element 29 may be readily inserted into and removed from the heating tube 27.

As shown in FIG. 1, the vapor-expulsion unit 11 is arranged to be operated at will by two independent sources of heat, each of which alone is capable of supplying heat at an adequate rate and at a sufficiently elevated temperature to the vapor lift pipe to effect normal operation of the refrigeration apparatus under all conditions under which the apparatus is intended to be operated. This is accomplished by providing a second heating tube or flue 38 which includes bottom, intermediate and top tubes 38a, 38b and 38c, respectively, the vapor-forming part of the vapor lift pipe 10 being in thermal exchange relation with the intermediate heating tube 38b at 39, as by welding, for example. Hence, the same vertical zone of the vapor lift pipe 10 is in thermal exchange relation with both the heating tube 27 and the heating flue 38. While I do not wish to be limited thereto, the bottom tube 38a and top heating tube 38c may be formed of non-metallic material which possesses good heat resisting properties, and the intermediate tube 38b may be formed of metal possessing good heat conducting properties.

The bottom heating tube 38a is of larger cross-sectional area than the intermediate and top tubes 38b and 38c and projects through a bottom opening 40 in the shell 33, and the top heating tube 38c projects through a top opening 41 in the shell and is formed with an enlarged end or collar 42 at its lower end which fits snugly against the upper end of the intermediate heating tube 38b. A suitable fluid fuel burner 43 is arranged to be supported in an upright position in any suitable manner within the bottom part 38a of the heating flue, so that the combustion gases will be used most effectively for heating the heating flue 38.

It will now be understood that the heating tube 27, which forms a permanent part of the heating structure, may be employed as a component of the heating structure suitable for electrical operation; and that the heating flue 38, which also forms a permanent part of the refrigeration apparatus and is operatively associated with the vapor lift pipe 10 of the vapor-expulsion unit 11, may be employed as a component of the heating structure suitable for operation by the burner 43 to which a fluid fuel, such as gas or kerosene, for example, is adapted to be supplied. The burner 43 and heating flue 38 operatively associated therewith function as a gas burner heating means operable to maintain a flame burning in the atmosphere for producing combustion gases at an elevated temperature and for expelling refrigerant vapor out of solution in the generator member 10 by heat derived from the combustion gases substantially at the elevated temperature.

The vapor lift pipe or tube 10 forms the place of heating in the refrigeration apparatus and functions as the only heat receiving member of the apparatus and through which liquid is raised by vapor-liquid lift action for circulating solution in the absorption solution circuit. The pipe or tube 10 has an upstanding outer side wall which defines a vertical space which holds a column of absorption solution. The hollow sleeves 27 and 38b are disposed exteriorly of the upright tube 10 and function as first and second heating members, respectively. The exterior surfaces of the sleeves 27 and 38b are welded at 28 and 39, respectively, to the upstanding outer side wall of the tube or pipe 10, whereby the column of absorption solution in the tube 10 always receives heat at its outer periphery from each of the hollow sleeves or heating members 27 and 38b. The hollow sleeves 27 and 38b are laterally spaced from one another with both of the hollow sleeves being disposed outside of each other and permanently connected to the same vertical pipe 10 of the heat receiving structure of the refrigeration apparatus.

When refrigeration apparatus like that illustrated in FIG. 1 is intended to be operated electrically, the electrical conductors 36 and 37 are connected to a suitable source of electrical supply. When the refrigeration apparatus of FIG. 1 is intended to be operated by a fluid fuel, the burner 43 is connected to a source of supply of the fuel and ignited. When the electrical heating element 29 and burner 43 inadvertently are operated at the same time, the vapor-expulsion unit 11 is subjected to excessive heating which tends to shorten the life of the refrigeration apparatus. It is therefore desirable to protect the refrigeration apparatus so that, when the apparatus inadvertently is connected to both sources of heat for a prolonged interval of time, at least one of the sources of heat is rendered inoperable to supply heat in the normal range to the vapor-expulsion unit 11. Such a protective arrangement is diagrammatically shown in FIGS. 1 and 2 in which the electrical heating element 29 is connected to a source S of electrical energy by the conductors 36 and 37, a switch 44 being connected in the conductor 36. The burner 43 is connected to a source S' of gaseous fuel, for example, by a supply conduit 45 in which is connected a manually operable valve 46. The pipe 45 is also provided with a valve 47 having a thermal member 48 associated therewith which functions to keep valve 47 open when a flame is being maintained at the burner 43 and to close valve 47 when the burner flame is extinguished.

The burner 43 is provided with a lighter tube 49 into which gaseous fuel is diverted from the supply conduit 45. The outer free end of the lighter tube 49 terminates at a discharge orifice 50 for maintaining a pilot flame at the vicinity of the thermal member 48. In the lighter tube 49 is provided a valve 51 which is spring biased to its closed position and can be opened by mainpulating a push button 52. To start the burner 43 valve 46 may be opened and the push button 52 then pressed to open valve 51, whereby gaseous fuel can flow through the lighter tube 49 and the fuel discharged from the orifice 50 can be ignited to provide a pilot flame which functions to heat the thermal member 48. When the latter is heated sufficiently it in turn functions to open valve 47 and supply fuel to the burner 43 which is ignited by the pilot flame, whereupon the push button 52 may be released to close valve 51 and shut off the pilot flame.

During normal operation of the refrigeration apparatus when either the electrical heater 29 or the gaseous fuel burner 43 alone is functioning to supply heat in the normal range to the vapor-expulsion unit 11, the different parts of the unit are heated to definite elevated temperatures which are within a safe operating range which does not impair the life of the refrigeration apparatus. However, when both the electrical heater 29 and the gaseous fuel burner 43 are functioning at the same time for a prolonged interval of time to supply heat in the normal range to the vapor-expulsion unit 11, the different parts of the unit are heated to elevated temperatures which are abnormally high and tend to shorten the life of the refrigeration apparatus.

In accordance with my invention, in order to insure that the different parts of the vapor-expulsion unit 11 always will be heated to elevated temperatures which are within a safe operating range, the heating structure embodies means whereby, when both the electrical heater 29 and gaseous fuel burner 43 inadvertently are connected to supply heat in the normal range at the same time to the vapor-expulsion unit 11, at least one of the sources of heat is rendered inoperable to supply heat in the normal range to the unit responsive to an abnormally high temperature condition of one or more parts of the unit, the supply of heat by the one heat source being reduced or stopped. As shown in FIGS. 1 and 2, this may be accomplished by providing a thermal bulb 53 which is arranged to be influenced by the temperature of the top heating tube 38c of the heating flue 38. The thermal bulb 53 is connected by a capillary tube 54 to a control device 55 which is connected in the conductors 36 and 37. In a manner well known in the art, the thermal bulb 53 and tube 54 may form part of an expansible fluid thermostat which is charged with a suitable volatile fluid and responds to an abnormally high temperature condition of the top tube part 38c of the heating flue 38 to cause control device 55 to open the circuit for the electrical heater 29 and render the latter inoperable to supply heat to the vapor-expulsion unit 11.

If desired, the thermal bulb of the expansible fluid thermostat may be arranged so that it responds to an abnormally high temperature condition of both the top tube 38c of the heating flue 38 and the heating tube 27. As shown in FIG. 3, this may be accomplished by heat conductively connecting the thermal bulb 53 to the top flue part 38c and also heat conductively connecting the thermal bulb 53 and heating tube 29 by an elongated member 56 formed of good heat conducting material, such as copper or aluminum, for example.

Also, the expansible fluid thermostat may be arranged to control the supply of heat to the vapor-expulsion unit 11 by the gaseous fuel burner 43. Such an arrangement is shown in FIG. 4 in which the thermal bulb 53' is connected by a capillary tube 54' to a control device 55' which is connected in the fuel supply conduit 45 of the gas burner 43. In FIG. 4 the expansible fluid thermostat responds to an abnormally high temperature condition of the top tube part 38c of the heating flue 38 to cause control device 55' to stop the supply of fuel to the burner 43 and render the latter inoperable to supply heat in the normal range to the vapor-expulsion unit 11.

The heating structures shown in FIGS. 1 to 4 and described above also may be employed for heating a vapor-expulsion unit 111 like that illustrated in FIG. 5. FIG. 5 is generally like FIG. 1 with similar parts referred to by the same refence numerals to which 100 has been appended. In FIG. 5 the heating tube 127 and heating flue 138 are heat conductively connected, as by welding, for example, to vapor lift pipes 110a and 110b, respectively. The lower ends of the vapor lift pipes 110a and 110b are connected to receive absorption liquid from the lower end of the standpipe 126. Absorption liquid rich in refrigerant flows by gravity from the absorber vessel (not shown) through the outer pipe 120 of the liquid heat exchanger 121 and lower part of conduit 112 to the standpipe 126.

When heat is being supplied in the normal range to the heating tube 127 by the electrical heater 129, liquid is raiseed in pipe 110a by vapor lift action, the vapor flowing from the pipe 110a through conduit 130 into standpipe 126 and from the latter through conduit 112 to the condenser. In FIG. 5 the lower part of the conduit 112 functions as an analyzer. The liquid raised in pipe 110a, which is weak in refrigerant, flows into standpipe 122 and passes from the lower end thereof through the inner passage 124 of the liquid heat exchanger 121 to the absorber coil for flow therethrough.

When heat is being supplied in the normal range to the heating flue 138 by the gaseous fuel burner 143, liquid is raised in pipe 110b by vapor lift action. When this occurs the vapor flowing from the upper end of pipe 110b flows to the condenser in a path of flow which includes conduit 130, standpipe 126 and the conduit 112. The liquid raised in pipe 110b flows through standpipe 122 and inner passage 124 of the liquid heat exchanger 122 to the absorber coil for flow therethrough.

In FIG. 5, the thermal bulb 153 of the expansible fluid thermostat is arranged to be influenced by the temperature of the top heating tube 138c of the heating flue 138. The thermal bulb 153 may be connected by a capillary tube 154 either to a control device like the control device 55 in FIG. 1 or to a control device like the control device 55' in FIG. 4. Also, the thermal bulb 153 may be heat conductively connected to the heating tube 127 by an elongated member similar to the elongated member 56 in FIG. 3. In the vapor-expulsion unit 111 shown in FIG. 5 the heating tube 127 and heating flue 138 are thermally separated from one another by insulation 132. With this arrangement the heating tube 127 or heating flue 138 to which heat is not being supplied is not heated to an elevated temperature by heat conducted thereto from the heating tube 127 in heating flue 138 to which heat is being supplied and the heat radiation losses from the vapor-expulsion unit 111 are reduced.

While particular embodiments of the invention have been shown, it will be apparent that modifications may be made without departing from the spirit and scope thereof, as set forth in the claims.

I claim:

1. A refrigeration system of the type employing gas and electricity as power sources, in which cooling is effected by refrigeration apparatus having a vapor-expulsion unit comprising a plurality of parts including means for raising liquid by vapor-liquid lift action, a gas burner heating means disposed adjacent to said liquid raising means for raising liquid by vapor-liquid lift action, means for supplying gas energy to said burner heating means, electrical heating means for heating said liquid raising means for raising liquid by vapor-liquid lift action, means for supplying electrical energy to said electrical heating means, said vapor-expulsion unit being heated to normal elevated temperatures by heating effected in a normal range by either one of said heating means and being heated to an abnormally high elevated temperature by heating effected in the normal range at the same time by both of said heating means, and control means responsive to an abnormally high temperature condition of at least one of said parts to reduce the supply of energy to at least one of said heating means when heating of said liquid raising means is being effected by both of said heating means and said vapor-expulsion unit is heated to the abnormally high elevated temperature.

2. A refrigeration system as set forth in claim 1 in which said control means functions to reduce the supply of electrical energy to said electrical heating means responsive to the abnormally high temperature condition when heating of said liquid raising means is being effected by both of said heating means and said vapor-expulsion unit is heated to the abnormally high elevated temperature.

3. A refrigeration system as set forth in claim 1 in which said one part of said vapor-expulsion unit is embedded in insulation.

4. A refrigeration system as set forth in claim 1 in which one of said burner and electrical heating means includes a member heat-conductively connected to said one part and said control means includes an element heat-conductively connected to said member, said control means functioning to reduce the supply of energy to the other of said burner and electrical heating means.

5. A refrigeration system of the type employing gas and electricity as power sources, in which cooling is effected by refrigeration apparatus having a generator comprising a plurality of parts including means for raising liquid by vapor-liquid lift action, a gas burner heating means disposed adjacent to said liquid raising means for raising liquid by vapor-liquid lift action, means for supplying gas energy to said burner heating means, electrical heating means for heating said liquid raising means for raising liquid by vapor-liquid lift action, means for supplying electrical energy to said electrical heating means, said generator being heated to definite elevated temperatures by heating effected in a normal range by either one of said heating means and being heated to an abnormally high elevated temperature by heating effected in the normal range by both of said heating means at the same time, and control means responsive to an abnormally high temperature condition of at least one of said parts to shut off the supply of energy to one of said heating means when heating of said liquid raising means is being effected in the normal range by both of said heating means and said generator is heated to the abnormally high temperature.

6. A refrigeration system as set forth in claim 5 in which said control means functions to shut off the supply of electrical energy to said electrical heating means responsive to the abnormally high temperature condition when heating of said liquid raising means is being effected in the normal range by both of said heating means.

7. A refrigeration system as set forth in claim 5 in which said one part of said generator is embedded in a body of insulation.

8. A refrigeration system as set forth in claim 7 in which said burner heating means comprises a heating tube which is heat conductively connected to said one part and includes a portion disposed outside said body of insulation, and said control means being influenced by the temperature of said portion of said heating tube and functioning to shut off the supply of energy to said electrical heating means responsive to the abnormally high temperature condition of said one part.

References Cited by the Examiner

UNITED STATES PATENTS

| 2,009,067 | 7/1935 | Mulholland | 62—148 |
| 2,319,601 | 5/1943 | Hedlund | 62—148 X |
| 3,080,729 | 3/1963 | Grubb | 62—479 |
| 3,105,363 | 10/1963 | Von Der Scher | 62—148 |

ROBERT A. O'LEARY, *Primary Examiner.*